United States Patent
Cheng et al.

(10) Patent No.: US 7,031,543 B2
(45) Date of Patent: Apr. 18, 2006

(54) GRAYSCALE IMAGE DE-SPECKLE ALGORITHM

(75) Inventors: Hui Cheng, Bridgewater, NJ (US); Ying-wei Lin, Penfield, NY (US); Stuart A. Schweid, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 654 days.

(21) Appl. No.: 10/032,464

(22) Filed: Jan. 2, 2002

(65) Prior Publication Data

US 2003/0123749 A1 Jul. 3, 2003

(51) Int. Cl.
 *G66K 9/40* (2006.01)

(52) U.S. Cl. .................... 382/254; 382/260; 382/275; 358/3.27; 358/463

(58) Field of Classification Search ............... 382/260, 382/274, 275, 287, 294, 252, 270, 308; 358/3.26, 358/3.27, 463, 516, 520, 464, 465
See application file for complete search history.

(56) References Cited

U.S. PATENT DOCUMENTS

| | | | | |
|---|---|---|---|---|
| 5,424,783 A | | 6/1995 | Wong | |
| 5,517,234 A | * | 5/1996 | Gerber et al. | 348/126 |
| 5,583,659 A | * | 12/1996 | Lee et al. | 358/3.13 |
| 6,014,469 A | | 1/2000 | Eschbach | |
| 6,205,257 B1 | | 3/2001 | Eschbach | |
| 6,282,326 B1 | * | 8/2001 | Lee et al. | 382/289 |
| 6,317,223 B1 | * | 11/2001 | Rudak et al. | 382/275 |
| 6,393,150 B1 | * | 5/2002 | Lee et al. | 382/176 |

* cited by examiner

*Primary Examiner*—Bhavesh M. Mehta
*Assistant Examiner*—Yosef Kassa
(74) *Attorney, Agent, or Firm*—Oliff & Berridge, PLC

(57) ABSTRACT

An annular window-shaped structuring element is provided for image processing to remove speckles from a scanned image. The window-shaped structuring element is composed of two differently sized squares sharing the same geometric center-point. The pixel to be analyzed with the structuring element is at the center-point. The structuring element is used in a method to remove speckles from binary, grayscale, and/or color images by first eroding the image, detecting speckles relative to other pixels in the image, and removing declared speckles. The method may additionally include a halftoning module to protect halftone images.

34 Claims, 8 Drawing Sheets

8 Level / N Point Histogram for Video above this pixel (hin)

GRAYSCALE IMAGE DE-SPECKLE ALGORITHM

BACKGROUND OF THE INVENTION

1. Field of Invention

This invention relates to a system and method for improving the quality of scanned images, and more particularly, to the identifying and filtering of speckles from scanned images.

2. Description of Related Art

Photocopiers and scan-to-print image processing systems have typically been concerned with rendering the most accurate copy of the original possible. Sometimes, however, the most accurate copy producible includes imperfections arising from the original image. Although one usually desires the most accurate copy of the original, there is the occasion when customers would prefer to have the imperfections on the original image eliminated from the succeeding generation of copies.

One of the more prevalent imperfections transferred from the original image to the copy is known in the art as speckles, or pepper noise. Essentially, speckles are isolated dark spots on an image. They often arise during the scanning and printing process, and their removal is desired to improve the image quality of the copy.

To perform suppression or removal of speckles, it is known to use various de-speckle algorithms. In using a de-speckle algorithm, selectivity is key. The algorithm must suppress or remove speckles, and only speckles, from the image. Other image structures of the image such as text, halftones, graphics, etc., need to be preserved.

In addition to selectivity, a de-speckle algorithm should be efficient. This is especially true where the image path becomes more and more complex. In such circumstances, the resources that can be allocated to each component on the image path become more and more limited.

Available de-speckle algorithms are mostly designed for binary images, i.e., black and white images. There is a growing need for cost-effective grayscale de-speckle algorithms that input grayscale and color images, and output de-speckled images.

SUMMARY OF THE INVENTION

In view of the foregoing background, it is an object of the present invention to remove speckles from grayscale and color images in an efficient and cost-effective manner.

These and other objects are achieved by the present invention using a frame-shaped structuring element comprising two differently dimensioned squares each sharing a common center point. The structuring element is scanned over an image to detect speckles, or isolated dark spots on the image. Once a speckle is identified, it is compared to its surroundings and replaced by its surrounding's color if the speckle is darker than its surroundings by a predetermined threshold value.

This invention may be used on binary, grayscale, and color images. It also includes an optional module to preserve halftone dots such as, for example, the dots in "i" and "j." The optional halftone module connects the halftone dots with nearby characters in order to preserve them during the subsequent speckle detection and removal.

The frame-shaped structuring element may be further refined to increase efficiency of calculations during the scanning and detection for speckles. In particular, the algorithm used may be modified to save the window-shaped structuring elements as a set number of column histograms. As the structuring element scans to the right, one column histogram is subtracted from the left and a new column histogram is added from the right. This increases the efficiency because the remaining column histograms' values have been saved and need not be re-scanned.

BRIEF DESCRIPTION OF THE DRAWINGS

Other features of the present invention will become apparent as the following description proceeds and upon reference to the drawings, in which.

DETAILED DESCRIPTION OF PREFERRED EMBODIMENTS

An image is defined in terms of pixels. Each pixel is an electrical signal with a digital gray value (in a grayscale image), which varies between a white value (assigned a value of 255 in this system) and a black level (assigned a value of 0 in this system). Pixels may also be identified in terms of position, wherein the pixel defines a particular area within the image identified by its position in a scanline, and the scanline's position in the image.

In order to better understand the basic structure of the claimed de-speckle algorithm, some basic grayscale morphological operations must be understood. A number of morphological operations map a source image onto an equally sized destination image according to a rule defined by a pixel pattern called a structuring element. The structuring element is defined by a center location and a number of pixel locations, each having a defined value (ON or OFF). The pixels defining the structuring element do not have to be adjacent each other. The center location need not be at the geometrical center of the pattern; indeed it need not even be inside the pattern. In the case of the present invention, however, the "center" of the structuring element is the geometrical center of the defined pattern.

In the present invention, let f(x) be an image, and s(x) be a two-dimensional function called the structuring element.

Erosion is a morphological operation wherein a given pixel in the destination image is turned ON, if and only if, the result of superimposing the structuring element center on the corresponding pixel location in the source image results in a match between all ON and OFF pixels in the structuring element and the underlying pixels in the source image. Using the above functions, grayscale erosion is defined as:

$$(f \ominus s)(x) = \min_{z \in D[s_x]} \{f(z) - s_x(z)\}$$

where $s_x(z) = s(z-x)$, and $D[s_x]$ is the domain of s(x). Where s(x) is zero over $D[s_x]$, the erosion may be defined as:

$$(f \ominus s)(x) = \min_{z \in D[s_x]} f(z).$$

A second important grayscale morphological operation is dilation. Dilation is a morphological operation wherein a given pixel in the source image being ON causes the structuring element to be written into the destination image with the structuring element center at the corresponding location in the destination image. The structuring elements used for dilation typically have no OFF pixels. In terms of the above functions, dilation is defined as:

$$(f \oplus s)(x) = \max_{z \in D[f]} \{f(z) + s(x-z)\}$$

Grayscale opening is a combination of erosion followed by dilation. The result is to replicate the structuring element in the destination image for each match in the source image. Opening is defined as:

$$(f \circ s)(x) = [(f \square s) \oplus s](x)$$

Finally, grayscale closing is defined as a combination of dilation followed by erosion, defined as:

$$(f \bullet s)(x) = [(f \oplus s) \square s](x)$$

Figure 1:
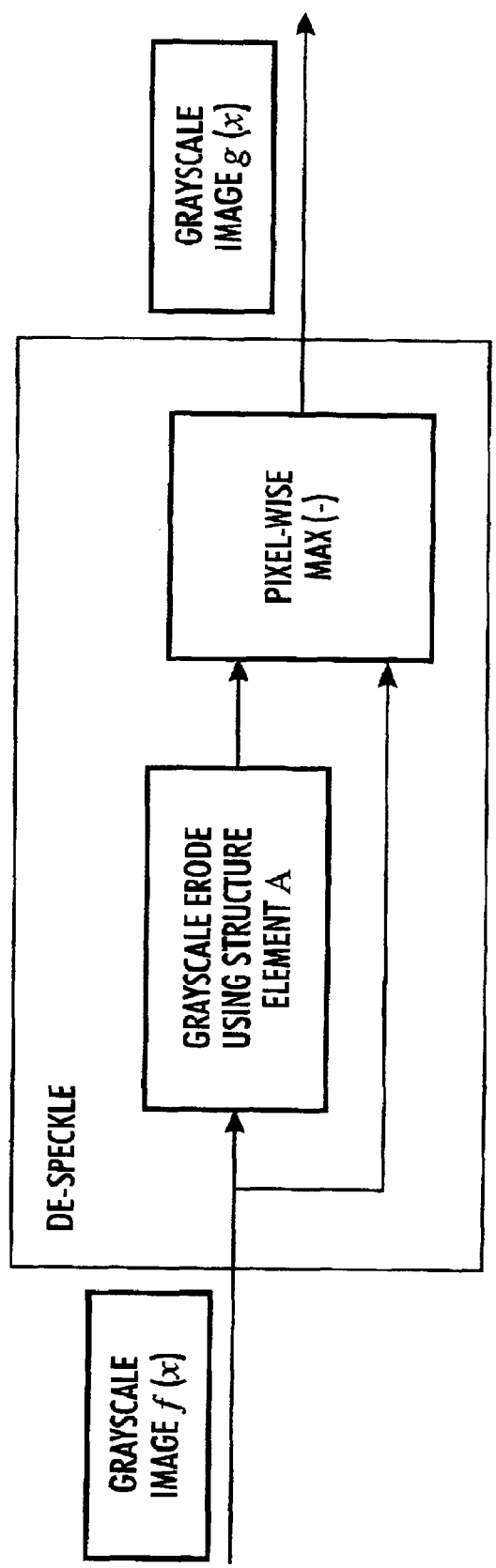
FIG. 1 is a block diagram of the basic approach of the claimed de-speckle algorithm.

The present invention is shown as a block diagram in FIG. 1, wherein an input (original) grayscale image is first eroded using a specially designed annular window structuring element A. Each individual pixel is then evaluated by value and location relative to other pixels after being eroded. If the original pixel has a larger value (lighter color) than the value of the eroded image, the original pixel value is used as the pixel value in the output image. If the original pixel value is lower (darker color) than the value of the eroded image, the pixel value of the eroded image is used as the output pixel value.

If f(x) is the input grayscale image and g(x) is the output grayscale image, then the claimed de-speckle algorithm may be formally expressed as $$g(x) = \max \{(f \square A)(x), f(x)\},$$

wherein x is a two-dimensional vector, which specifies the location of the pixel.

Figure 2:
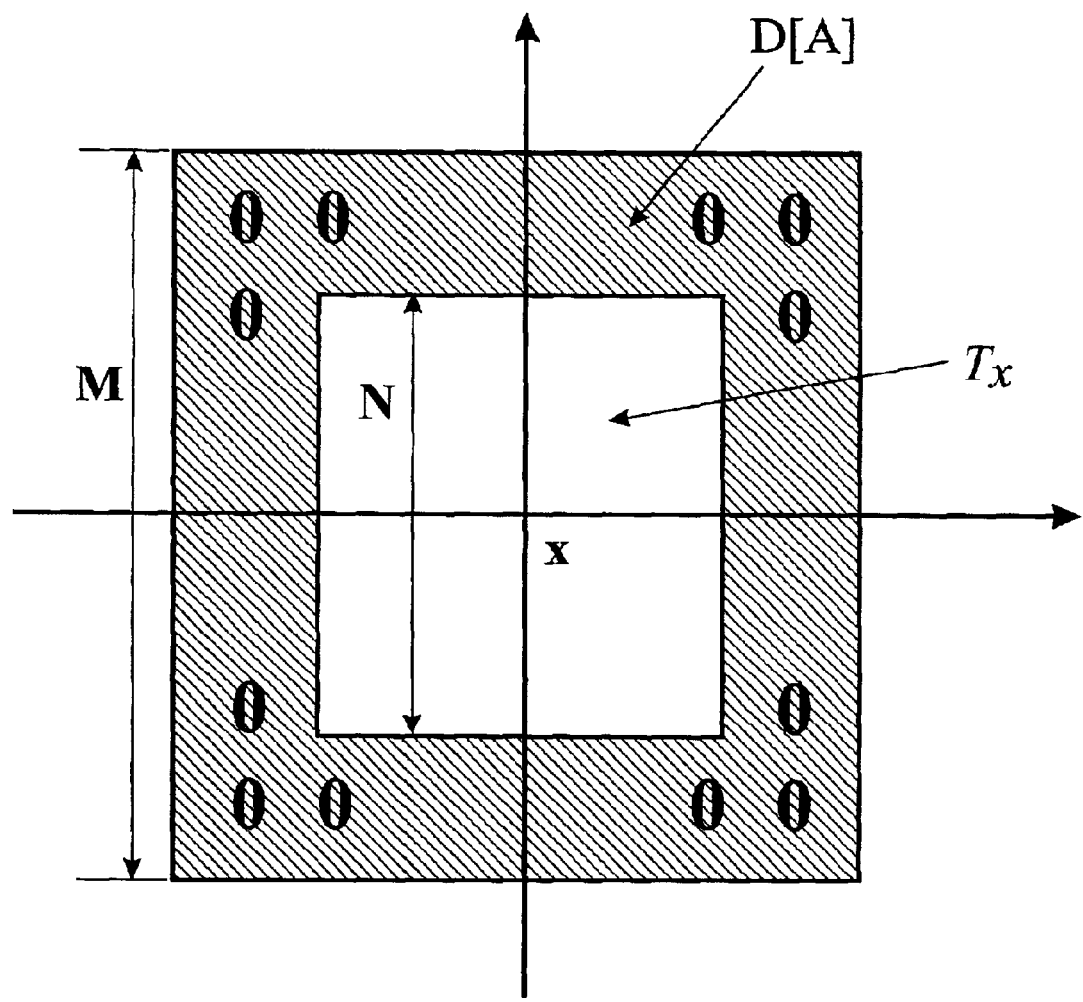
FIG. 2 is the annular window of structuring element A.

The structuring element A in the de-speckle algorithm comprises a frame-shaped domain. See FIG. 2. The dimension of the inner square is N, and the dimension of the outer square is M. The size of the largest speckle that can be removed by the algorithm is controlled by the value assigned to N. The definition of "isolation," the distance the speckle is from other objects, is specified by M. Both parameters, N and M can be adjusted or set by a user. The domain of the region between the two squares of structuring element A is denoted as D[A], and is the region between two squares (MM−NN) sharing the same center. In a preferred embodiment, A has a constant value of zero over the entire domain in order that erosion becomes a minimization over a sliding window. Thus, $$A(x) = 0, \text{ for } x \in D[A]$$

and $A_x$ is the structuring element shifted by x, the pixel location. The effect of eroding, using the structuring element A at pixel x, is finding the darkest pixel value in $D[A_x]$. Thus, if the darkest pixel in $D[A_x]$ has a color lighter than the original color at x, then the de-speckle algorithm will replace the original color at x with a lighter color. If the darkest color in $D[A_x]$ is darker than the original color at x, then the color will not be changed.

The present de-speckle algorithm is computationally efficient. It needs at most MM−NN+1=O(M) comparisons per pixel, where O is the function used to designate upper limits. Additionally, it needs to buffer at most M scanlines.

The explanation to this point may be more clearly understood using a simplified scenario wherein the background is white (pixel value 255) and uniform. In such a scenario, an isolated dark spot with dimensions less than N/2 in both directions will be filled in with the white background color. An "isolated dark spot" is a pixel or group thereof, wherein the distance between this spot and any other non-background regions is larger than M/2.

In this scenario, uniform regions with at least one dimension larger than N will not be changed. Such uniform regions may, for example, be text and fine line graphics. The present de-speckle algorithm will also not change thin lines with different gray levels, lying very close to each other. In addition, the algorithm will not change the synthetic sweep regions.

If the isolated dark spot has dimensions less than N in both directions, but larger than N/2 in at least one direction, a portion of the isolated dark spot will be filled with the background color. Ultimately this is not desired, but does not result in objectionable alterations in the copy because N is usually quite small.

The de-speckle algorithm does not guarantee to preserve halftones. Halftoning is also known as "screening," and generally comprises reproducing an image wherein the grayscale values of a continuous image are to be represented using only varying areas of either black or white. Various techniques for electronic halftoning have been disclosed. In electrical halftoning, a signal representing the image information is combined with the halftone screen and thresholded electronically so that the output signal is binary.

Since halftoning is not preserved in the present algorithm, an additional module may be included to preserve halftone images. The optional halftone protection module requires additional computational needs. The halftoning module may be best suited to be used to protect the fine structures of text such as, for example, the dots on "i" and "j," and periods.

Figure 3:
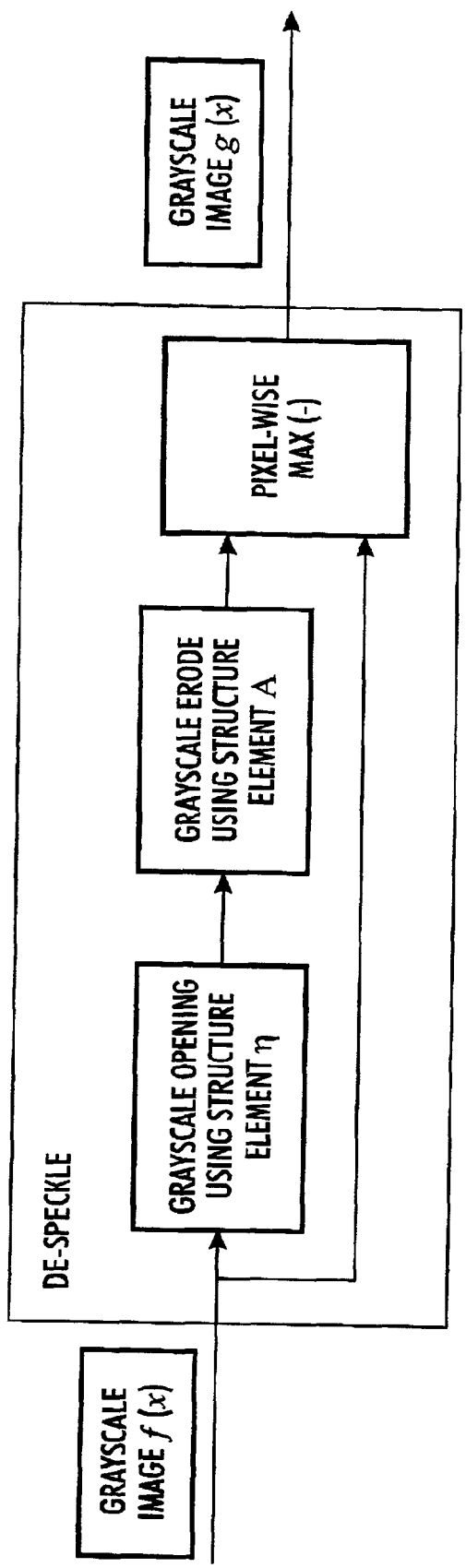
FIG. 3 is a block diagram of the grayscale algorithm with halftone protection.

The halftoning module comprises three steps to preserve halftone images. This is represented in the block diagram of FIG. 3. First, an input grayscale image, f(x), is passed through a halftone protection module where a series of grayscale openings are applied to connect halftone dots together. This also merges dots in text regions, such as, for example, periods and dots in "i" and "j," with nearby characters. Thus, the dots in text are preserved. The halftone image, h(x), is created.

Figure 4:
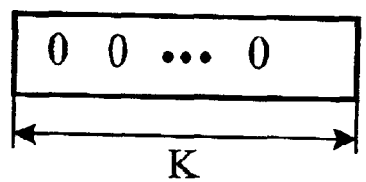
FIGS. 4–8 are the structuring elements η used in halftone protection.
Figure 5:
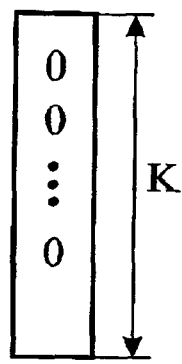
Figure 6:
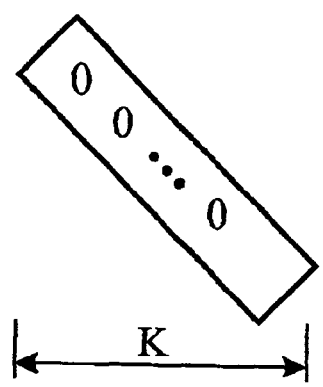
Figure 7:
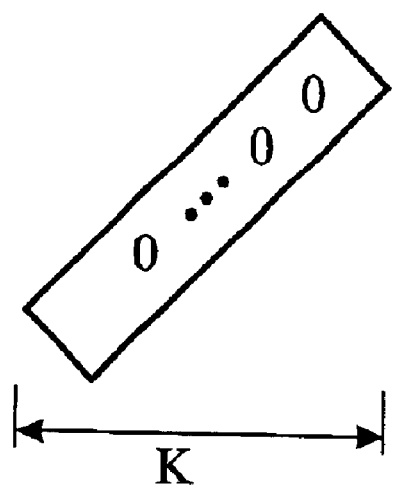
Figure 8:
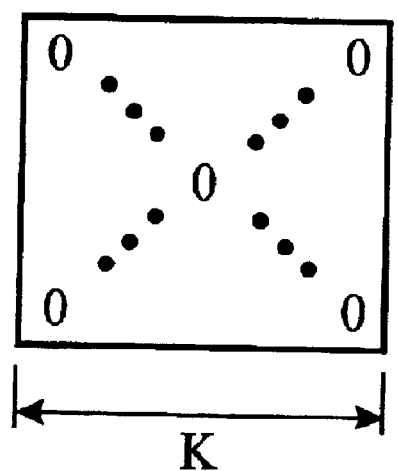

The grayscale openings performed on the input grayscale image may use a one- or two-dimensional structuring element η. See FIGS. 4–8. The structuring elements η are each comprised of K pixels. The structuring element η may comprise, for example, a line of K pixels in the x-axis (FIG. 4), the y-axis (FIG. 5), or a forty-five degree angle relative to both the x- and y-axis (FIGS. 6 and 7). The structuring element η may comprise two lines of K pixels running perpendicular to each other and intersecting at their midpoints so as to form an "X" shape (FIG. 8).

The second step in preserving the half-tone image comprises the detection of speckles in the output halftone image, h(x). The halftone image is eroded using the structuring element A. If the pixel value of the eroded h(x) is larger than h(x) by a predetermined threshold, a speckle is detected. A detected speckle is marked as black at that pixel location.

It should be noted that one speckle in h(x) can correspond to multiple black pixels in the image after thresholding. In other words, a speckle may be marked several times in determining the threshold value. Computation complexity could be reduced if a speckle is to be marked only once. Thus, a thinning-step may be employed to post-process the image after thresholding. It is fairly easy to show that each connected component of black pixels in the image after thresholding corresponds to one speckle. Therefore, the thinning algorithm will find each connected component in the image after thresholding, and replace it with a single black pixel.

The third step would be the removal of the speckles from the image. The algorithm for speckle removal comprises the frame-shaped structuring element A comprising two squares sharing the same central point, x. The set of pixels located inside the inner square is described as $T_x$. If x is marked as a speckle location, the structuring element A, wherein $D[A_x]$ describes the set of pixels between the outer square and the inner square, then the mean color of $D[A_x]$ will be calculated. The mean color of $D[A_x]$ is denoted as $C_x$. The colors of all pixels of $T_x$ are then replaced with $C_x$. Thus, the pixel color in the inner square is replaced by the average color of the pixels between the outer square and the inner square.

The halftone algorithm comprises three parameters. These include the length of the halftone protection filters, K, and the parameters of the structuring element A, M and N. K defines the isolation of the speckle since halftone protection connects halftone dots and small structures in text regions. As such, in halftone protection, M does not define the isolation of a pixel. Therefore, M may be selected to be as small as possible, for example, M=N+2. In setting M to such a value, the number of parameters is now reduced to two.

Figure 9:
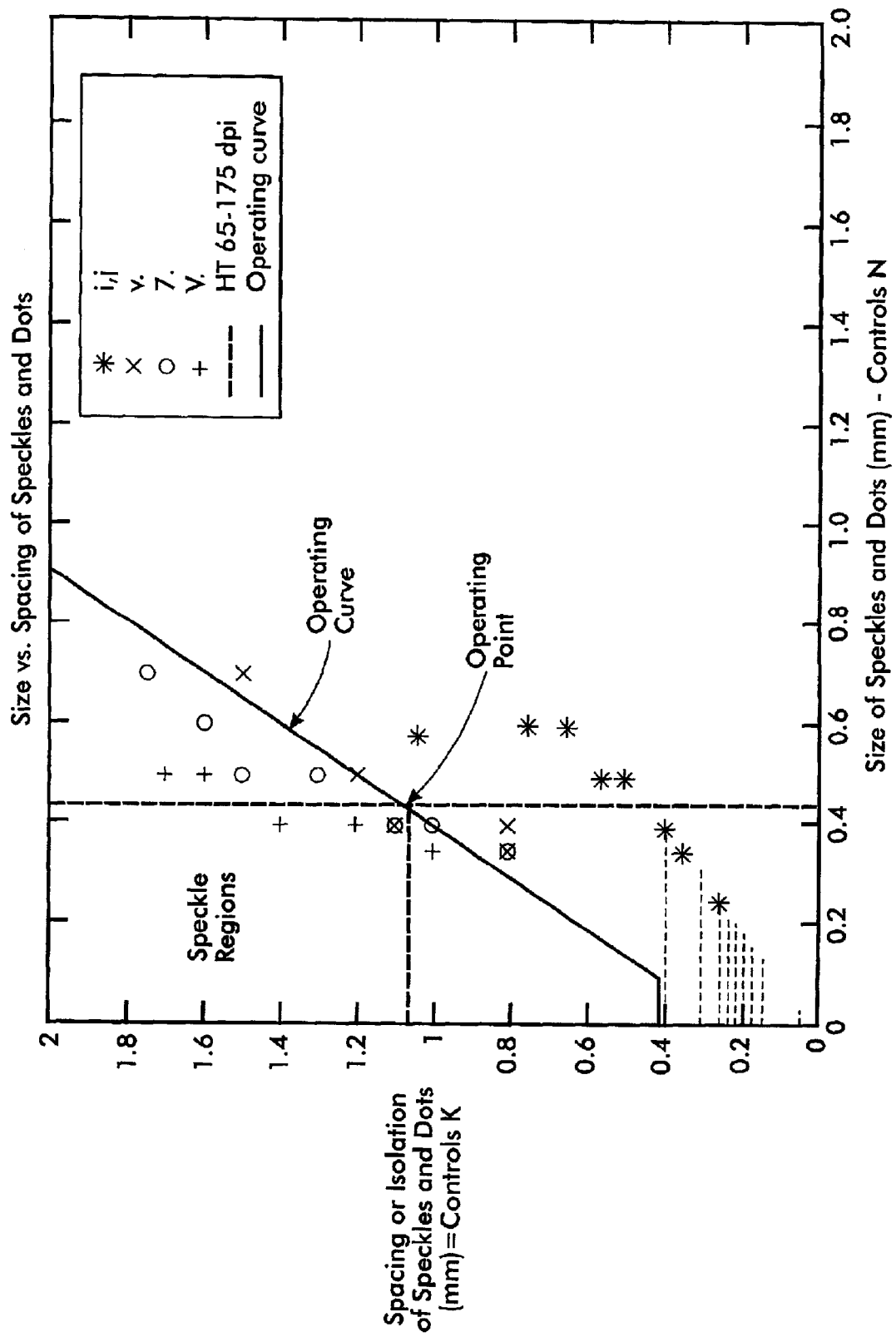
FIG. 9 is an empirically fabricated curve showing parameter optimization relating size of speckles to spacing or isolation of speckles.

K may also be correlated to N to generate one parameter, N, the maximum speckle size for a user to adjust. An operating curve correlating the relationship between K and N was determined empirically by studying the relationship between the sizes of halftone dots, dots in "i," "j," periods and the spacing between these dots and the nearest objects for different fonts and different point sizes. See FIG. 9. For each maximum size of speckles selected, an operating point is determined on the operating curve. The operating point can then be used to determine the spacing between a dot that needs to be preserved and the nearest object. All the dark spots that have smaller sizes and larger spacing than the size and spacing specified by the operating point will be removed as speckles.

The grayscale de-speckle algorithm may also remove some speckles in halftone regions. Sometimes, although the halftone protection connects the halftone dots, a speckle remains as an isolated dark spot due to its intensity difference from the neighboring halftone dots. In such a situation, the speckle may be detected, removed and replaced by a uniform gray. Although such a speckle in a halftone region is replaced by a relatively large, uniform gray dot without the halftone dots structure, it is not likely to cause any noticeable artifact. In high frequency halftones, since the gray dot has the same mean color as the background, it may not be noticed at all. In a real product, the grayscale image will be de-screened and then re-screened for printing, so the gray dot will not be visible.

Figure 10:
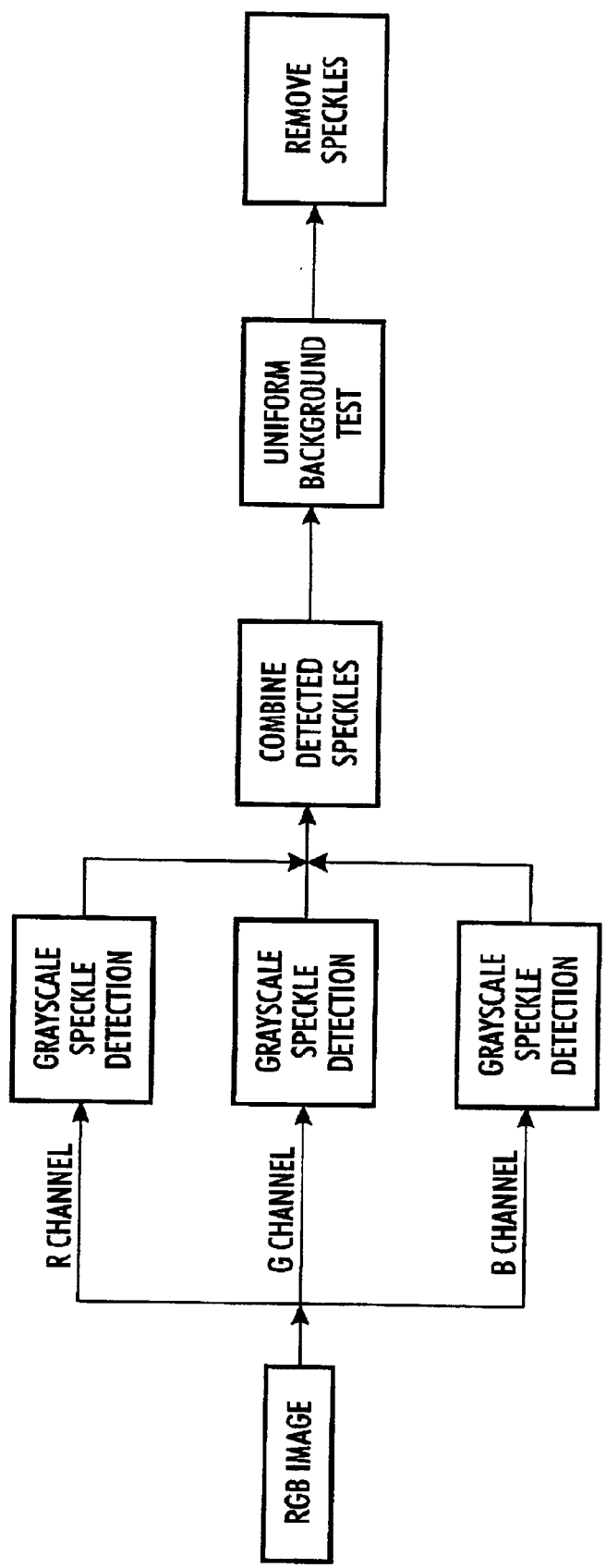
FIG. 10 is a block diagram of the de-speckle algorithm for color images.

This algorithm is not limited to only binary or grayscale images. Speckles in color images may also be removed using the same basic algorithm and the steps represented by the block diagram of FIG. 10. First, the algorithm detects possible speckles in each color channel independently. As with the grayscale images, a possible speckle is declared a speckle when it's surrounding is sufficiently uniform and differs from the possible speckle. The speckle is removed by filling the speckle pixels with the background colors.

This aspect of the invention first assumes that the input image is in linear RGB (Red, Green, Blue) color space. Next, the input RGB image is split into three monochrome images. Each monochrome image consists of one of three channels of the original image. The grayscale speckle detection algorithm taught above is used to detect speckles in each of the grayscale images. If a pixel location x is detected as a speckle in one of the three channels, then x is referred to as a possible speckle.

Not all possible speckles are real speckles in color images. For example, the speckle detection algorithm of the invention declares only a dark spot as a speckle if it is sufficiently isolated from other image structures, such as lines, text and halftone dots. But since a possible speckle can be detected using only one color channel, the possible speckle may be close to image structures in other color channels. For example, assume that there is a blue dot beside a red line. The blue dot will be declared as a possible speckle in the blue channel because it is sufficiently isolated from other blue images in the blue monochrome image. However, because the blue dot is close to a red line, it is not a real speckle.

In order to prevent the removal of such suspect speckles, a uniform background test will be performed on all possible speckle locations. Once the grayscale speckle detection has been performed on each individual color, the detected speckles are combined, and the uniform background test is performed on the combined color image to remove only those speckle locations with a uniform background.

The uniform background test uses the structuring element A described above. The outer window, D[A], is the region between two square windows sharing the same center. The inner square has a dimension N, and the outer window has a dimension M. $D[A_x]$ defines the outer window of the structuring element A centered at x, a pixel location. The set of pixels inside the inner square is denoted as $T_x$.

By using this annular window at a possible speckle location, x, the variances of the three color channels, R, G and B of $D[A_x]$ are computed. If all three variances are less than a given threshold, the background is considered to be uniform, and x is declared to be a speckle.

To remove the detected speckle, the mean color of the annular window, $D[A_x]$, is computed. Then all the pixel colors in $T_x$ are replaced with the mean color of $D[A_x]$.

The described algorithm may be further defined into order to increase efficiency and reduce expensive hardware implementation. In particular, there are two model-based de-speckle algorithms of concern. Both use the mean, the standard deviation and the skewness of an annular window in order to approximate the minimum value of that window. Each of these will be defined below wherein X is a random variable. Then, the nth central moment of X, $\mu_n$, is defined as:

$$\mu_n = E(X-EX)^n.$$

E is the expected mean value for X. The mean, $\mu$, is defined as:

$$\mu = EX.$$

The standard deviation, $\sigma$, is:

$$\sigma = (\mu_2)^{1/2}.$$

The skewness, α, is:

$$\alpha = \frac{\mu_3}{(\mu_2)^{3/2}} = \frac{\mu_3}{\sigma^3}$$

The algorithm again uses an annular window wherein two squares of different sizes share the same center-point. The inner square has a dimension N, and the outer square has a dimension M. The outer window, D[A], is the region between the outer square and the inner square. The set of pixels inside the inner square is denoted as $T_x$.

The de-speckle algorithm is designed for scanned grayscale monochromatic images. Thus, for simplicity, the first algorithm assumes that there are only two levels of gray, B and W, in an annular window. Further, in regard to pixel values, B is less than W.

It may be further assumed that the percentages of pixels with gray level B is p*100%, and the percentages of pixels with gray level W is (1−p)*100%. B, W and p can be calculated using the above μ, σ, and α. Thus, $$B = \mu + \frac{\alpha - \sqrt{\alpha^2 + 4}}{2}\sigma$$

$$W = \mu + \frac{\alpha + \sqrt{\alpha^2 + 4}}{2}\sigma$$

$$p = \frac{1}{2} + \frac{\alpha}{2\sqrt{\alpha^2 + 4}}$$

At pixel x, B is denoted as $B_x$ when using the above equation for B. $B_x$ is the estimate of the minimum value of $D[A_x]$. Then, x is declared as a speckle where $$f_{i,j} - B_x < \Gamma$$

where $f_{i,j}$ is the actual gray level of a pixel, and Γ is a pre-determined threshold. In a preferred embodiment, Γ is set to −60, which is shown empirically to produce favorable results.

Once speckles are detected, they will be removed using the above algorithm. As noted before, the pixels inside the annular window are denoted as $TX_x$. Then, if x, a pixel in $T_x$, is marked as a speckle location, the mean color of $D[A_x]$ is calculated and denoted as $C_x$. All the colors of pixels in $T_x$ are replaced with the color of $C_x$.

This approach is advantageous in that it relies only on the sample mean, the standard deviation and the skewness. Each can be computed very efficiently using the sum of pixel values, sum of squares and the sum of cubes of the annular filter.

It is assumed that the annular window is moving in the fast scan direction, typically left to right, and although it contains $M^2-N^2$ pixels, only 2(M+N) values need to be known in order to calculate the first three sample central moments from the previous ones. Further, only one pass through the video is needed. This approach does have the disadvantage of needing to store the sum of cubes of an annular window. The annular window may be quite large, for example, M=51 and N=13, so it could prove difficult and inefficient to store the sum of cubes.

A second approach may also be used that uses only the mean and the variance. This approach first classifies the pixels in the annular window, $D[A_x]$, into two sets, $B_x$ and $W_x$. The $B_x$ set contains all the pixels with a gray level less than 128, and the $W_x$ set contains all the pixels with a gray level greater than or equal to 128. The mean and variance of each set are calculated. If $B_x$ is not empty, the minimum of $D[A_x]$ is approximated as the maximum of 0 and the mean of $B_x$ minus 3 times the standard deviation of $B_x$. In other words, where $B_x$ is not empty, $$\min D[A_x] \approx \max[0, \text{mean}(B_x) - 3*\text{var}(B_x)].$$

If the $B_x$ set is empty, the minimum of $D[A_x]$ is approximated to be the maximum of 0 and the mean of $W_x$ minus 3 times the standard deviation of $W_x$. Thus, where $B_x$ is empty, $$\min D[A_x] \approx \max[0, \text{mean}(W_x) - 3*\text{var}(W_x)].$$

Then, similar to the first approach, x is declared a speckle if the pixel value of x is less than the estimated minimum of $D[A_x]$ by a given threshold. The speckles are then removed using the same method described in the first approach.

There is an additional means by which to make the de-speckle algorithm more computationally efficient. As detailed above, the de-speckle algorithm analyzes pieces of the whole image through a smaller window to compute the minimum of the grayscale image. The smaller window is a square of side length N. As this window moves across a scan line, the minimum for the window must be recomputed by accessing every pixel within the window of side length N.

Figure 11:
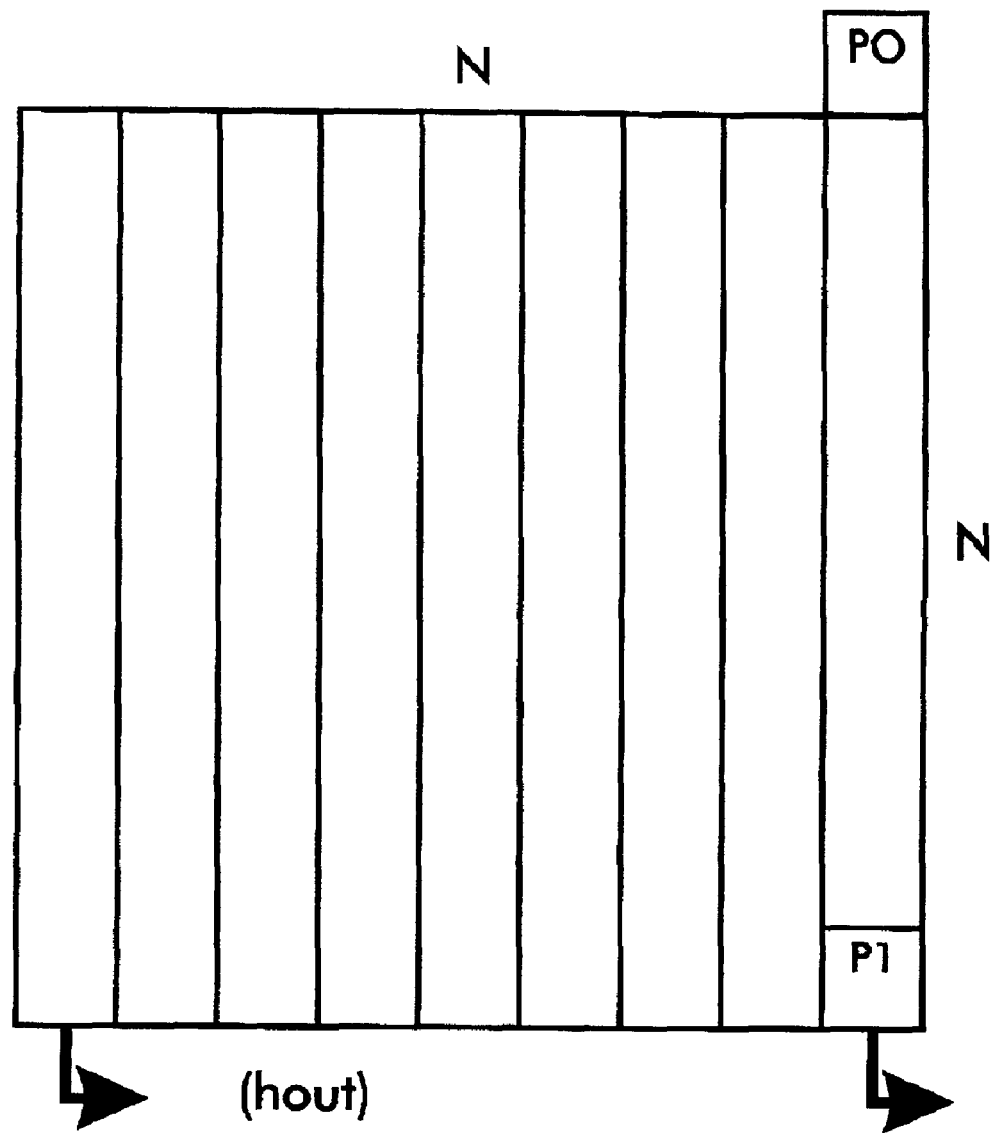
FIG. 11 is the de-speckle algorithm's inner square comprised of column histograms.

The algorithm may be computed more efficiently by first quantizing the image, i.e., reducing the data width, from eight bits to a smaller number. In one preferred embodiment, the data width is reduced to three bits. The de-speckle algorithm is then initialized by computing eight-bin histograms for each column in the window and an eight-bin histogram for the entire window. The column histograms are shown in FIG. 11. Thus, the window histogram is the sum of the column histograms. When the window moves one pixel to the right while scanning, the left most column histogram from the window histogram is subtracted as a new histogram is computed for the new incoming column on the right. The new column histogram is saved and added to the window histogram, and the minimum of the grayscale image is obtained from the window histogram.

This de-speckle algorithm may be used for the above annular window-type histogram as well. In order to calculate the histogram of a square annulus, the aggregate histogram of an outer and inner box is calculated simultaneously. The histogram of the annulus is then simply the difference between the outer box and the inner box histograms.

The computational savings in this de-speckle algorithm is substantial. The add/subtracts of this algorithm are much easier to perform in superscalar pipeline architectures, i.e., PENTIUM® and MAP1000®, than typical compares and min/maxs. It is easier to perform because the add/subtracts do not require the possible "if-then-else" for minimums or compares. Further, the additions can sometimes be performed using single instruction, multiple data (SIMD) instructions, or many adds in one clock cycle.

Further, given a local cache with a size typical of present processors, i.e., 128K, then all the histogram read/writes will be in cache. This means that only 2 non-cached read/writes will be required. This adds up to a substantial reduction in memory allocation time, and an increase in algorithm speed.

This algorithm is also feasible in hardware. The cached read/writes correlate to on-chip memory, so off chip bandwidth is no longer an issue. Similarly, there are presently only two off chip memory accesses per pixel making SDRAM an expensive viable option.

The present invention as described above is used to remove dark speckles from a light background. With slight modification, the algorithm may be used to remove light speckles from a dark background, e.g., speckles in inverted text. All that is required to modify the algorithm to remove light speckles from a dark background is to replace (a) dilation with erosion operators (and vice versa), (b) black and white values (and vice versa), (c) greater than with less than comparisons (and vice versa), (d) max with min (and vice versa), (e) 0 with 255 (and vice versa), and (f) negate the threshold Γ. Another alternative for removing light speckles is to invert the image, run the invention as disclosed, and invert the image again.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image processing system including a de-speckle algorithm having an associated structuring element A for detecting and removing speckles from a scanned image comprising a window shape comprising two squares of different sizes sharing the same geometric center point, wherein the pixel to be evaluated is at the center point of the structuring element A, wherein an inner square of the structuring element A has a side dimension N, and an outer square has a side dimension M, wherein N represents a largest speckle that can be removed and M represents a dimension the speckle lies from other objects.

2. An image processing system according to claim 1, wherein M is at least equal to N+2.

3. An image processing system according to claim 1, wherein a domain of the structuring element A, D[A], is a region between the two squares sharing the same center.

4. An image processing system according to claim 3, wherein the domain of the structuring element A has a constant value of zero over the entire domain.

5. A method for removing speckles using an algorithm comprising
    (a) eroding a grayscale image if the background is light or dilating the grayscale image if the background is dark with a structuring element A for detecting and removing speckles from a scanned image comprising a window shape comprising two squares of different sizes sharing the same geometric center point, wherein the pixel to be evaluated is at the center point of the structuring element A;
    (b) detecting potential speckles by examining each eroded pixel within the structuring element by a pixel value and a pixel location relative to other pixels;
    (c) evaluating whether a detected potential speckle is an actual speckle; and
    (d) removing pixels determined to be actual speckles.

6. The method according to claim 5, wherein eroding the grayscale image with the structuring element A comprises finding a darkest pixel value if the background is light, and finding the lightest pixel value if the background is dark in a domain of structuring element A.

7. The method according to claim 6, wherein a pixel in the center of the structuring element A is replaced if the darkest pixel value in the domain of structuring element A is lighter than an original color of the pixel in the center if the background is light.

8. The method according to claim 6, wherein a pixel in the center of the structuring element A is replaced if the lightest pixel value in the domain of structuring element A is darker than an original color of the pixel in the center if the background is dark.

9. The method according to claim 6, wherein a pixel in the center of the structuring element A is not replaced if the darkest pixel value in the domain of structuring element A is darker than an original color of the pixel in the center where the background is light.

10. The method according to claim 6, wherein a pixel in the center of the structuring element A is not replaced if the lightest pixel value in the domain of structuring element A is lighter than an original color of the pixel in the center where the background is dark.

11. The method according to claim 5, further comprising applying a series of grayscale openings to connect halftone dots together prior to detecting and removing speckles with a structuring element A.

12. The method according to claim 11, wherein the series of grayscale openings comprise one- or two-dimensional structuring elements η.

13. The method according to claim 12, wherein the structuring elements η comprise a line of K pixels in a x-axis, a line of K pixels in a y-axis, a line of pixels lying in at a forty-five degree angle relative to the x-axis wherein the line of pixels is K pixels long in the x-axis, and two lines of pixels running perpendicular to each other and intersecting at their midpoints wherein a distance between two adjacent corners is K, wherein K is a predetermined value.

14. The method according to claim 11, further comprising a thinning-step after the detection of speckles wherein each connected component in the image is detected and replaced with a single black pixel if the background is white.

15. The method according to claim 11, wherein a mean color of the domain of the structuring element A is calculated and replaces all the pixels in the inner square of the structuring element if a speckle is detected by the structuring element A.

16. The method according to claim 5, wherein a color image is first split into independent monochromatic images representing each color before the color image is eroded.

17. The method according to claim 16, wherein the detected speckles of each color are combined and a uniform background test is performed to remove only those speckles with a uniform background.

18. The method according to claim 17, wherein the detected speckles are replaced by a calculated mean color of D[A].

19. The method according to claim 5, wherein the detected potential speckle is an actual speckle where $$f_{i,j} - B_x < \Gamma$$

wherein $f_{i,j}$ is an actual pixel value at pixel x, $B_x$ is the estimate of the minimum value of $D[A_x]$, and $\Gamma$ is a pre-determined threshold.

20. The method according to claim 19, wherein $B_x$ is calculated as $$B_x = \mu + \frac{\alpha - \sqrt{\alpha^2 + 4}}{2} \sigma$$

wherein $\mu$ is mean, $\sigma$ is standard deviation, and $\alpha$ is skewness.

21. The method according to claim 19, wherein there are only two levels of gray, B and W.

22. The method according to claim 19, wherein $\Gamma$ is a constant predetermined threshold.

23. The method according to claim 19, wherein all the pixels inside an inner square of the structuring element A are replaced by a mean color of the domain of the structuring element A, D[A], a region between the two squares sharing the same center, if a speckle is declared.

24. The method according to claim 19, wherein there is only one pass of the image through a video.

25. The method according to claim 5, wherein all the speckles in a region between the two squares sharing the same section of structuring element A, D[A], are classified into two sets, $B_x$ and $W_x$, where $B_x$ contains all the pixels with a gray level less than 128, and $W_x$ contains all the pixels greater than or equal to 128, and a mean and a variance of each set is calculated.

26. The method according to claim 25, wherein if the $B_x$ set is not empty, the minimum of D[A] is approximated as the maximum of 0 and the mean of $B_x$ minus 3 times the standard deviation of $B_x$.

27. The method according to claim 25, wherein if the $B_x$ set empty, the minimum of D[A] is approximated to be the maximum of 0 and the mean of $W_x$ minus 3 times the standard deviation of $W_x$.

28. The method according to claim 25, wherein an examined pixel is declared an actual speckle where the examined pixel is less than the estimated D[A] by a predetermined threshold, and is removed by replacing all pixels inside the inner square of the structuring element A by a mean color of the domain of the structuring element A, D[A].

29. The method according to claim 5, wherein the image is quantized to fewer than 8 bits of data.

30. The method according to claim 29, wherein the image is quantized to 3 bits of data.

31. The method according to claim 29, wherein an eight-bin histogram is computed for each column in an annular window of structuring element A, and an eight-bin histogram is computed for an entire annular window.

32. The method claim 31, wherein a window histogram is the sum of the 8 column histograms.

33. The method according to claim 32, wherein as the window moves right to scan an image, a left most column histogram of the window is subtracted as a new histogram is computed for an incoming column histogram on the right.

34. The method according to claim 33, wherein the incoming histogram is saved and added to the window histogram, and the minimum of the grayscale image is obtained from the window histogram.

* * * * *